United States Patent [19]

Krueger

[11] 4,436,374
[45] Mar. 13, 1984

[54] FORKLIFT SAFETY SCOPE

[76] Inventor: Henry A. Krueger, 4920 S. Linder Ave., Chicago, Ill. 60638

[21] Appl. No.: 339,997

[22] Filed: Jan. 18, 1982

[51] Int. Cl.³ .......................... G02B 5/08; G02B 5/10
[52] U.S. Cl. ..................................... 350/302; 350/307
[58] Field of Search .................... 350/301, 302, 307

[56] References Cited

U.S. PATENT DOCUMENTS 3,979,158  9/1976  Yamashita et al. ............. 350/307 X
4,172,638 10/1979  Freedman ............................ 350/302

FOREIGN PATENT DOCUMENTS 3013225 10/1981 Fed. Rep. of Germany ...... 350/307
134620  3/1979 German Democratic Rep. .................................... 350/302

Primary Examiner—John K. Corbin
Assistant Examiner—Richard F. Gallivan
Attorney, Agent, or Firm—John H. Shurtleff

[57] ABSTRACT

A safety scope in combination with a forklift truck for improved front and rear viewing while the operator is seated in under normal working conditions. The safety scope comprises an elongated housing or viewing box mounted between two upright posts of the forklift with periscopic mirrors in the box and two convex mirrors on the back side of the box near each end thereof. The improvement preferably includes resilient rubber mounting means to cushion the mounting of the box and mirrors.

8 Claims, 7 Drawing Figures

FORKLIFT SAFETY SCOPE

BACKGROUND OF THE INVENTION

This invention is concerned with the safe operation of a forklift truck and, especially, with the ability of the forklift operator to maintain a clear and unobstructed view to the front and to the rear of the truck.

A forklift truck is generally a self-propelled, heavy duty vehicle operated by a single driver who preferably remains seated at all times for reasons of safety, normally looking straight ahead and being careful to avoid accidents as the truck is constantly maneuvered back and forth in relatively confined spaces to pick up and move packages, containers or the like. The forward view of the operator is frequently blocked by a horizontal cross member which joins the side posts of the forklift mast or upright frame at the front end of the truck. Moreover, forklift trucks are seldom equipped with a rear view mirror because conventional adjustable mirrors cannot withstand the constant jarring, bumping and vibrating movements to which the truck is subjected even under the best factory or warehouse conditions. The movable parts used to mount such mirrors become quickly worn or damaged so as to prevent proper adjustment or placement of the mirror in a fixed and steady position.

A recent attempt to provide a mirror arrangement on a forklift truck is set forth in U.S. Pat. No. 4,172,638 wherein a pair of mirrors are mounted on a bracket arm extending laterally to one side of the truck. This particular arrangement offers a limited front and back view and has the same disadvantages noted above because the arm and bracket structure together with swivel mounted mirrors are easily damaged.

It is one object of the invention to provide a forklift truck with safety mirrors permitting both front and rear views for the operator when seated during normal operating conditions. It is also an object of the invention to provide these views for the truck operator over as wide an area as possible so that accidents are more easily prevented. Still another object of the invention is to provide means for mounting multiple mirrors in relatively fixed and secure positions which cannot be loosened or damaged by repeated impacts or vibrations arising under typical working conditions. These and other objects and advantages of the invention will become more apparent upon consideration of the following detailed disclosure taken with the accompanying drawings and claims.

SUMMARY OF THE INVENTION

It has now been found, in accordance with the invention, that the safe operation of forklift trucks can be substantially improved, particulary in a forklift truck having a front lift assembly with two vertical side posts at the front end of the truck and a horizontal bar or cross member securely joining the two posts at an elevated position which blocks a forward view of the truck operator during normal operating conditions. Briefly, this improvement is achieved by periscope means including an elongated tubular housing mounted on the back side of the cross member, this housing having an upper portion rising above the cross member with a front transparent window and a lower portion located behind the cross member with a back transparent window, each window extending over most of the length of the housing, a paired set of periscopic mirrors being mounted diagonally within the housing for periscopic viewing from the upper back window down to the lower back window, and two convex mirrors, each being mounted adjacent the opposite ends of the housing on the back side of its upper portion for wide-angle viewing to the rear.

THE DRAWINGS

The invention is illustrated by way of example in the accompanying drawings in which.

Figure 1:
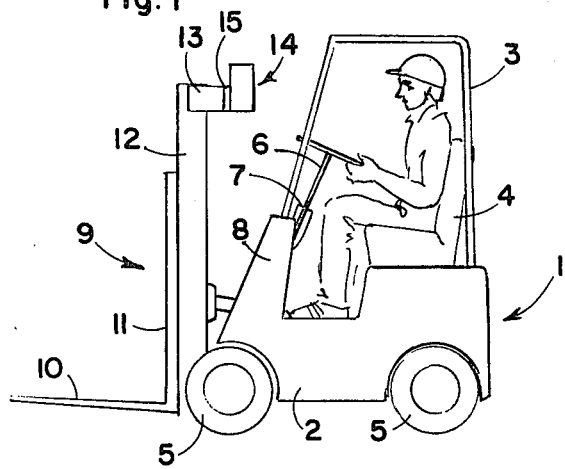
FIG. 1 is a side elevational view of a forklift truck as it is operated with the safety scope of the invention mounted securely on the front cross member of the truck.

It will be understood that the invention is not limited to the specific examples shown in the drawings since there are many variations in both structure and materials which can be adopted without departing from the sprit or scope of the invention. In general, the housing for the safety scope is preferably made of sheet steel but may also be constructed of aluminum or be formed with a molded plastic body. While glass mirrors are preferred, the two viewing windows are preferably made of Plexiglass ® or a similar clear polymethyl methacrylate.

DETAILED DESCRIPTION OF THE INVENTION

Referring first to FIG. 1, the forklift truck 1 has a main body 2 which is relatively heavy and compact with a low center of gravity and an upper frame 3 which provides an open cage for the operator riding on the cushioned seat 4. Four wheels 5 carry the truck in a conventional manner, operated by the steering wheel and shaft 6 which together with the forklift controls 7 are mounted on the front panel 8 of the body 2. The forklift 9 equipped with the tines 10 on its vertical back frame 11 is raised and lowered by means of the vertical masts or side members 12, e.g. in the form of an outer C-beam 12a (shown in FIG. 2) in which the I-beams 11a and 11b of the forklift frame 11 are interfitted or nested to slide up or down in response to a conventional hydraulic lift system. The horizontal cross member or reinforcing bar 13 connects the vertical masts 12 near their upper end and usually falls at about the eye level of the operator so as to at least partly obscure forward viewing. Because the back frame 11 of the forklift is otherwise very open in its structure, the operator has a good view of the fork tines 10 and the area immediately in front of the truck at the floor level. More distant viewing to the front of the truck tends to be partly or wholly cut off by the cross member 13.

Figure 2:
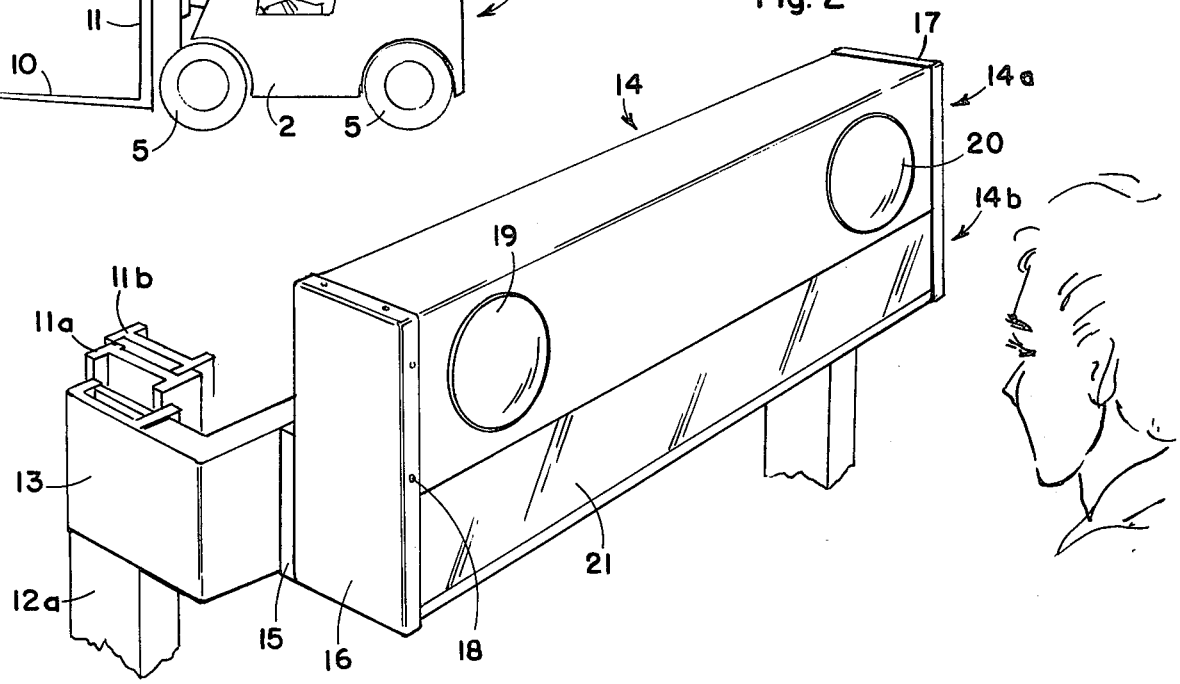
FIG. 2 is a partial perspective view taken from behind and to the left side of the operator to generally illustrate the safety scope of the invention.

The safety scope of the invention, as shown in both FIGS. 1 and 2, is in the form of an elongated viewing box 14 with an oblong or elongated hollow tubular shape which extends over the entire length of the cross member 13 and is firmly mounted on the backside thereof, preferably by means of a rubber mounting block or similar vibration-damping and shock-absorbing member 15. This block 15 can extend the full length of the box 14 and forklift cross member 13, or else one may use two or more separate mounting blocks, for example with the box or housing 14 being bolted through such blocks to the cross member 13.

The box 14 is enclosed at both ends by the two end caps 16 and 17 which may be fastened securely in place by any suitable means such as the machine screws 18. This construction permits the viewing box to be sealed to keep the interior relatively free of dust and grime. In addition to the periscope mirrors mounted within the box 14 (as shown more fully in FIG. 5), two convex mirrors 19 and 20 are mounted in a fixed position on the back side of the upper portion 14a of the box relatively near either end thereof. These two convex mirrors effectively provide a wide area of viewing to the rear of the operator, both to the left and to the right. At the same time, these convex mirrors are firmly mounted in a shock-proof manner and do not extend laterally beyond the forklift truck but are located in a more protected position directly behind the cross member 13. Also, the operator uses both convex mirrors so as to be aware of obstacles or other persons to the rear of the truck at the same time that a wide forward view is available in looking through the periscope arrangement indicated by the lower back window 21 in FIG. 2. Both rear and front views are achieved while the operator remains in a seated position and generally looking forwardly of the truck.

Various alternatives may be adopted to mount the viewing box or safety scope 14 on the front upright framework 9 of the forklift, preferably to a supporting or reinforcing cross bar or horizontal member 13. It is important, however, to provide at least one shock-absorbing and vibration-damping means such as the rubber block 15 between the framework 9 and the box 14. This arrangement not only reduces mirror breakage but also helps to prevent excessive vibration of the mirrors as induced by the motor of the truck or by the movement of the truck over rough surfaces.

Figure 3:
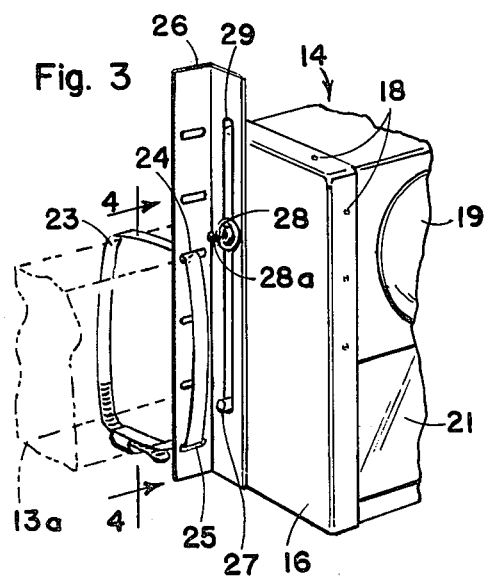
FIG. 3 is a fragmentary perspective view taken at the left end of the safety scope to illustrate an alternative means of mounting the device.
Figure 4:
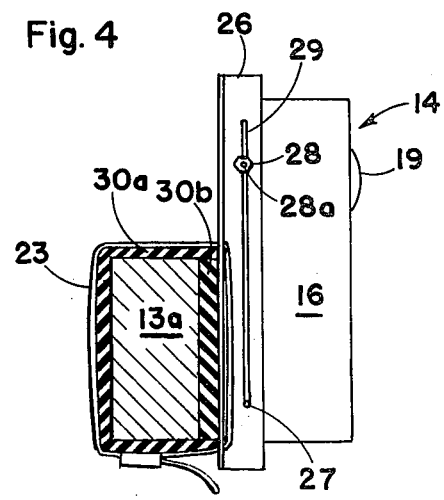
FIG. 4 is a cross sectional view taken through the cross member and safety scope on line 4—4 of FIG. 3 in order to further illustrate the mounting means in detail.

In FIGS. 3 and 4, one alternative mounting means for the viewing box 14 is illustrated in partly schematic form, omitting all of the forklift structure except for the cross member 13a which may be furnished as part of the box 14 to be added to the forklift frame 9 or which may already be a part of the frame 9. In either case, it will be understood that this cross member 13a will extend between upright members of the frame 9 and may also extend laterally outwardly a short distance beyond this frame as indicated by the phantom lines in FIG. 3. In most cases, the conventional construction of the forklift will provide a cross member 13a or a suitable position for such a cross member with a free peripheral area near both ends where a strap 23 can be wound around the cross member 13a and tightened while it also passes through two openings 24 and 25 of the L-shaped mounting bracket 26 which in turn is firmly attached to the end cover 16 of the viewing box 14 by means of the guide stud 27 and locknut 28 on the projecting bolt 28a, both the stud 27 and bolt 28a being mounted in fixed positions on the end cap 16 and projecting through the elongated slot 29 of bracket 26. The slot 29 permits a vertical adjustment of the position of box 14 for a particular operator.

One strap 23 is used at each end of the box 14, and is shown in the form of a clamping strap as used on airplane hoses and the like. Other suitable heavy duty clamping means may also be used together with any mounting bracket on the box 14 which will provide a secure connection of this box to a cross member 13a. The use of a hose clamping strap and a simple mounting bracket has been illustrated because all of the required parts are readily available and offer flexibility in adapting to different forklift trucks at a low cost.

As shown in FIG. 4 only, a circumferentially positioned rubber mounting insert 30 is used to provide the desired shock-absorbing and vibration-damping effect as the viewing box is otherwise held in a fixed position. The mounting insert 30 has been omitted in FIG. 3 to better show the clamping strap but is actually installed underneath the strap, preferably with a width slightly greater than the strap, so as to completely surround the cross member 13. It is also preferable to make the insert 30 from two separate lengths of rubber strapping or belt material with a first length 30a to fit around three sides of the cross member, i.e. the front side and the upper and lower sides, and with a second length 30b to fit along the back side. This second length 30b can be made in different sizes or one can use several strips to adjust the thickness of rubber at this location. Depending upon the resilient properties of the rubber, one may use thicker or thinner rubber inserts 30b to give an optimum shock-absorbing and vibration-damping effect.

Figure 5:
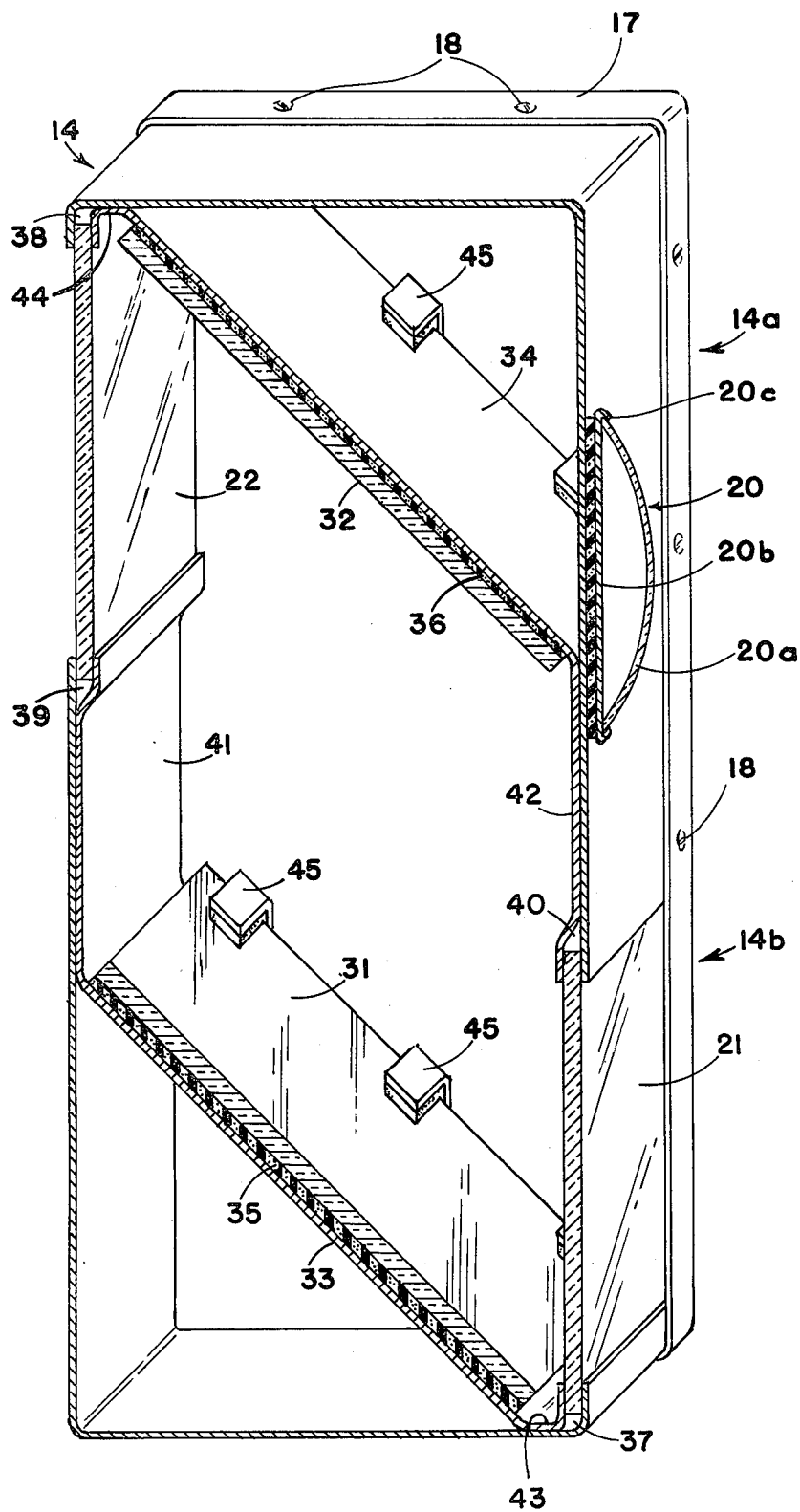
FIG. 5 is a sectional view in perspective at the right end of the safety scope to illustrate the housing structure and the support means for the different mirrors.
Figure 6:
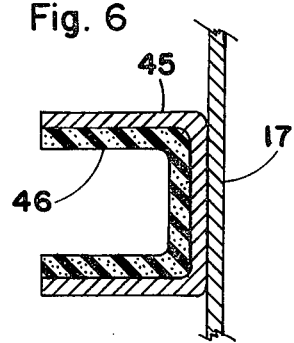
FIG. 6 is a longitudinal sectional view through a clip member which may be used for support of the periscope mirrors within the housing.
Figure 7:
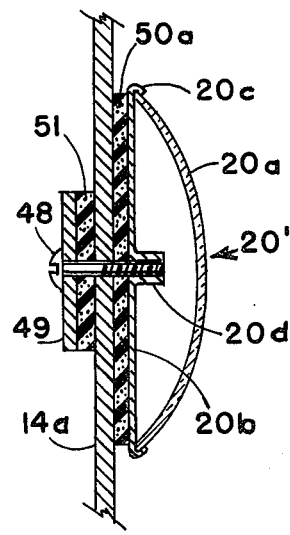
FIG. 7 is a transverse sectional view through one of the convex mirrors to illustrate an alternative mounting means.

FIGS. 5 and 6 illustrate different means of mounting the two periscope mirrors 31 and 32 within the housing or box 14 while FIG. 7 offers an alternative mounting of the convex mirror in its fixed position on the housing. These embodiments are intended to be illustrative only and not exclusive.

The perspective view in FIG. 5 is taken at the right end of the box 14, with reference to the position of the seated operator in FIGS. 1 and 2, in a vertical cross section which extends through the midpoint or center of the right-hand convex mirror 20. This interior view of the safety scope of the invention exhibits a preferred construction with a number of options based upon the same or similar principles. In all cases, similar parts are designated by the same or similar reference numerals.

In FIG. 5, the two periscopic mirrors 31 and 32 are held in diagonal positions on correspondingly diagonal bracing members 33 and 34 by means of the double faced foam tapes 35 and 36. The bracing members are preferably made of sheet steel of about the same thickness as the outer walls of the housing 14 so as to perform a number of functions. The two bracing members preferably extend over the entire length of the housing 14 in order to impart strength and stability to the housing and to provide longitudinal slots 37, 38, 39 and 40 along the upper front and lower back sides of the housing wall structure to receive the two transparent viewing windows or lens 21 and 22. These bracing members 33 and 34 can be permanently fixed in place by spot welding to the outer walls of the housing along their vertical flanges 41 and 42, respectively, and also along the upper and lower horizontal flanges 43 and 44, respectively.

Once the end caps 17 and 18 are removed from either end of the housing 14, it will be noted that front window 22 can be easily inserted or removed from slots 38 and 39 and, likewise, the back window 21 can be easily inserted or removed from the slots 37 and 40. In fact, these windows 21 and 22 extend the full length of the hollow tubular housing to form a significant part of its wall structure, permitting complete access to the interior of the housing 14 when needed for cleaning or other maintenance. On the other hand, once the end caps 17 and 18 are secured in place, the viewing box becomes a single compact and unitary structure capable of withstanding severe bumping and jarring movements.

The two bracing members 33 and 34 are normally placed at about a 45° angle to the vertical walls of the housing so that the two mirrors 31 and 32 permit periscopic viewing when mounted on the forklift truck.

The elastomeric foam sheets or tapes 35 and 36 are coated with a pressure sensitive adhesive on both faces and can be placed over the entire surface of the bracing members 33 and 34 for support of the mirrors 35 and 36, or else tapes 35 and 36 can be mounted at spaced intervals, provided that the strength of the adhesive is sufficient to firmly hold the mirrors in place. Due to the resilient nature of this foam rubber mounting of the two periscopic mirrors, the entire structure is given additional shock-absorbing and vibration-damping characteristics although the effect here is much less critical than the use of a rubber block or cushioning member 13 or 13a as indicated above. Another advantage of these resiliently mounted mirrors is the ease with which one can be replaced if it does become broken and also the way in which the adhesive-backed foam rubber holds the broken parts of the mirror until repairs can be made.

The two periscopic mirrors 31 and 32 may also be supported by a number of U-shaped clamps 45 positioned on a diagonal line along either end of the viewing box 14, preferably mounted securely to the inner face of each end cap 16 and 17 as indicated in both of FIGS. 5 and 6. These U-shaped or slotted clamps 45 are preferably lined with a resilient elastomer material 46, e.g. a foam rubber, which again helps to cushion the mirrors against shocks and unwanted vibrations. Where the housing is constructed of lighter weight materials and/or reinforced without using the diagonal bracing members, one can use these U-shaped clamps as the only mounting members for the mirrors or with only some additional support along the upper and lower horizontal edges of the two periscopic mirrors. Such variations in the resilient mounting means of the invention may be adopted without departing from the spirit or the scope of the invention.

The two convex mirrors 19 and 20 can have the simple hollow structure shown in FIG. 5, consisting of the convex mirrored glass element 20a and a circular metal holder 20b with a curled lip 20c around its periphery to hold the mirror 20a. The holder 20b is attached to the upper back side 14a of the housing by a circular sheet or disk 50 of a resilient elastomeric foam material coated on both sides with a pressure sensitive adhesive. These convex mirrors are relatively light in weight and are easily fastened in a permanent position toward each end of the viewing box or housing 14.

An alternative means of mounting a convex mirror is illustrated by the vertical sectional view of FIG. 7 where the circular holder 20b has a center threaded shaft 20d to receive the correspondingly threaded bolt 47 held by its head 48 on the inner side of the housing wall 14a by a ring washer 49. In this case a circular foam pad 50a and a foam ring 51 are inserted as resilient mounting means to provide additional shock-absorbing and vibration-damping means. By providing a series of bolt openings in the back wall 14a of the housing, the convex mirrors can be moved from one fixed position to another to accomodate the needs of a particular operator. However, it will be found that very little adjustment is needed due to the wide angle viewing offered by the these two mirrors. They offer a means for the operator to quickly detect sudden movements of other personnel or vehicles behind him, even when the operator's attention is primarily directed toward the front of the forklift vehicle. Also, the rear view provided by these convex mirrors is quite good so that the operator can back up the truck without turning his head or looking down toward the rear of the vehicle.

By using the safety scope of the invention, the operator of a forklift truck can do most of his work in a comfortable, forward-looking position so that there is much less strain and fatigue over the course of a working day, thereby substantially reducing the potential for accidents due to human failure. This safety scope will stand up under extended use, even when subjected to the worst possible factory and warehouse conditions. Because all of the elements are contained within or directly on a single box-like housing, the effect of shock and vibrations are minimized, and this front and rear viewing device will be found safe and reliable at all times.

The invention is hereby claimed as follows:

1. In a forklift truck having a front lift assembly including a frame with two vertical side posts projecting upwardly at the front end of the truck and a horizontal cross member joining the two posts at an elevated position which blocks the forward view of the truck operator during normal operating conditions, the improvement which comprises:

periscope means including an elongated tubular housing arranged on the back side of said cross member, said housing having an upper portion rising above said cross member with a front transparent window and a lower portion located behind said cross member with a back transparent window, each window extending over most of the length of the housing, a paired set of periscopic mirrors mounted diagonally within said housing in substantially parallel facing relationship for periscopic viewing from the upper front window down to the lower back window; and two convex mirrors, each being mounted near the opposite ends of said housing on the back side of its upper portion for wide-angle viewing to the rear of the operator.

2. The improvement in a forklift truck as claimed in claim 1 which further comprises at least one shock-absorbing and vibration-damping means in the mounting of said periscope means and said convex mirrors.

3. The improvement in a forklift truck as claimed in claim 2 wherein the shock-absorbing and vibration-damping means includes at least one resilient rubber member arranged between said cross member and said elongated tubular housing.

4. The improvement in a forklift truck as claimed in claim 3 wherein said resilient rubber member is an elongated rubber block fastened between said cross member and said housing.

5. The improvement in a forklift truck as claimed in claim 2 wherein said elongated tubular housing is mounted by a clamping strap fastened around said cross member and said at least one shock-absorbing and vibration-damping means includes a resilient rubber insert between said clamping strap and said cross member.

6. The improvement in a forklift truck as claimed in claim 5 wherein said resilient rubber insert consists of one replaceable segment fitting between the back side of said cross member and a mounting bracket on said elongated tubular housing and another segment fitting between the strap and the remaining sides of said cross member.

7. The improvement in a forklift truck as claimed in either of claims 2 or 3 wherein the periscopic mirrors are mounted on diagonally positioned bracing members within said housing which also reinforce the upper and lower portions of said housing.

8. The improvement in a forklift truck as claimed in either of claims 2 or 3 wherein said periscopic mirrors and said convex mirrors are individually mounted onto the housing by mounting members which include an adherent, resilient, foam rubber insert.

* * * * *